(12) United States Patent
Zisimopoulos et al.

(10) Patent No.: US 9,392,628 B2
(45) Date of Patent: Jul. 12, 2016

(54) PROVIDING ACCESS OF A USER EQUIPMENT TO A DATA NETWORK

(75) Inventors: Haris Zisimopoulos, London (GB); Ricky Kaura, Uxbridge (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 171 days.

(21) Appl. No.: 13/884,173

(22) PCT Filed: Nov. 7, 2011

(86) PCT No.: PCT/KR2011/008412
§ 371 (c)(1),
(2), (4) Date: Jul. 26, 2013

(87) PCT Pub. No.: WO2012/064055
PCT Pub. Date: May 18, 2012

(65) Prior Publication Data
US 2014/0007200 A1     Jan. 2, 2014

(30) Foreign Application Priority Data

Nov. 8, 2010   (GB) .................................. 1018858.9

(51) Int. Cl.
*H04W 12/00*         (2009.01)
*H04W 76/02*         (2009.01)
(Continued)

(52) U.S. Cl.
CPC ........... *H04W 76/021* (2013.01); *H04L 63/102* (2013.01); *H04L 67/306* (2013.01);
(Continued)

(58) Field of Classification Search
CPC ......... H04L 61/30; H04L 63/02; H04L 63/08; H04L 63/10; H04W 4/001

USPC ..................... 726/1–4, 21–30; 380/247–250, 380/269–274; 455/403–466
See application file for complete search history.

(56) References Cited

U.S. PATENT DOCUMENTS 7,447,765 B2 * 11/2008 Aerrabotu et al. ............. 709/224
8,654,706 B2 *  2/2014 Shaw et al. .................... 370/328
(Continued)

FOREIGN PATENT DOCUMENTS

EP        2 524 528 A2     11/2012
EP        2 638 772 A2      9/2013
(Continued)

OTHER PUBLICATIONS

3GPP TS 24.008 V8.11.0; Publisher: 3GPP; Date: Sep. 2010.*

*Primary Examiner* — Madhuri Herzog
(74) *Attorney, Agent, or Firm* — Jefferson IP Law, LLP

(57) ABSTRACT

A method and apparatus for providing access of a user equipment to a data network via a wireless communication system is provided. According to an embodiment of the invention, a method of providing access of a user equipment to a data network via a wireless communication system, the user equipment having an associated subscription profile, the wireless communication system utilizing access point identifiers for associating subscribers with specific packet data networks, said subscription profile including at least one access point identifier, the method comprises; setting subscriber profile parameter data in said subscription profile; receiving a first message sent from said user equipment requesting connection using a first access point identifier; determining on the basis of said subscription profile whether or not said user equipment may be connected using the first access point identifier; and dependent on the determination being negative and dependent on the subscriber profile parameter data being set, providing access to a packet data network using a different access point identifier.

23 Claims, 7 Drawing Sheets

(51) Int. Cl.

| | |
|---|---|
| *H04L 29/06* | (2006.01) |
| *H04W 4/00* | (2009.01) |
| *H04W 12/08* | (2009.01) |
| *H04W 48/02* | (2009.01) |
| *H04L 29/08* | (2006.01) |
| *H04W 12/06* | (2009.01) |
| *H04W 8/18* | (2009.01) |

(52) U.S. Cl.
CPC ............... *H04W 4/00* (2013.01); *H04W 12/06* (2013.01); *H04W 12/08* (2013.01); *H04W 48/02* (2013.01); *H04W 8/18* (2013.01)

(56) References Cited

U.S. PATENT DOCUMENTS

| | | | |
|---|---|---|---|
| 2003/0092390 A1* | 5/2003 | Haumont | ............... 455/67.1 |
| 2003/0212768 A1 | 11/2003 | Sullivan | |
| 2004/0044904 A1 | 3/2004 | Yamazaki et al. | |
| 2004/0192283 A1 | 9/2004 | Shaheen | |
| 2004/0267551 A1 | 12/2004 | Yadav | |
| 2005/0130658 A1 | 6/2005 | Stephens | |
| 2005/0154780 A1* | 7/2005 | Sarja | ............... H04L 12/66 709/203 |
| 2005/0157691 A1 | 7/2005 | Stewart et al. | |
| 2007/0123231 A1 | 5/2007 | Kim | |
| 2008/0175178 A1* | 7/2008 | Patin et al. | ............... 370/310 |
| 2010/0029248 A1 | 2/2010 | Shi et al. | |
| 2010/0112997 A1* | 5/2010 | Roundtree | ............ H04L 41/0816 455/420 |
| 2010/0214929 A1* | 8/2010 | Ljung et al. | ............... 370/241 |
| 2011/0249618 A1* | 10/2011 | Shaw et al. | ............... 370/328 |

FOREIGN PATENT DOCUMENTS

| | | |
|---|---|---|
| KR | 10-2004-0048529 A | 6/2004 |
| KR | 10-2010-0049886 A | 5/2010 |
| WO | 2004/012433 A1 | 2/2004 |

\* cited by examiner

PROVIDING ACCESS OF A USER EQUIPMENT TO A DATA NETWORK

TECHNICAL FIELD

The present invention relates generally to wireless communication systems, and more specifically, to a method and apparatus for providing access of a user equipment to a data network via a wireless communication system.

BACKGROUND ART

Wireless communications systems comprising wireless networks, in which a user equipment (UE) such as a mobile handset communicates via wireless links to a network of base stations or other wireless access points connected to a telecommunications network, have undergone rapid development through a number of generations of radio access technology. The initial deployment of systems using analogue modulation has been superseded by second generation (2G) digital systems such as GSM (Global System for Mobile communications), typically using GERA (GSM Enhanced Data rates for GSM Evolution Radio Access) radio access technology, and these systems have themselves been replaced by or augmented by third generation (3G) digital systems such as UMTS (Universal Mobile Telecommunications System), using the UTRA (Universal Terrestrial Radio Access) radio access technology. Third generation standards provide for a greater throughput of data than is provided by second generation systems; this trend is continued with the proposals by the Third Generation Partnership Project (3GPP) of the Long Term Evolution (LTE) system, using E-UTRA (Evolved UTRA) radio access technology, which offers potentially greater capacity and additional features compared with the previous standards.

LTE is designed as a high speed packet switched network, and voice services are provided as packet switched voice services and in particular Voice over Internet Protocol Multimedia Subsystem (VoIMS), whereas previous generation systems such as UMTS support voice services that are primarily circuit switched. Therefore, for LTE, both data and voice services are provided by a packet switched network, and a circuit switched connection is generally not available. The packet switched network is typically "always on", so that following a successful initial attachment, a user equipment remains connected to a packet data network.

If an initial attachment fails, then the user equipment may have no connectivity to the packet data network. This may occur, for example, if the user equipment requests connection to a packet data network associated with an access point name that is invalid or not available, or if the user equipment requests connection to a packet data network associated with an access point name to which the user equipment is not authorised to connect; a failure of authorisation may occur, for example, due to entering an invalid password.

In circuit switched systems, if a user equipment is denied access to a packet data network, a channel is typically available to allow the user equipment to be contacted with instructions as to how to connect to the packet data network, such as, for example, instructions on how to request a replacement password. For example, an SMS message may be sent to the user equipment.

DISCLOSURE OF INVENTION

Technical Problem

However, in a packet switched system such as LTE, there may be no parallel channel available to allow the user equipment to be contacted with instructions as to how to connect to the packet data network, and so an initial failure to attach may result in an inability to connect to the packet data network.

It is an object of the invention to ameliorate the problems with the prior art systems.

Solution to Problem

In accordance with a first aspect of the present invention, there is provided a method of providing access of a user equipment to a data network via a wireless communication system, the user equipment having an associated subscription profile, the wireless communication system utilising access point identifiers for associating subscribers with specific packet data networks, said subscription profile including at least one access point identifier, the method comprising:

setting subscriber profile parameter data in said subscription profile;

receiving a first message sent from said user equipment requesting connection using a first access point identifier;

determining on the basis of said subscription profile whether or not said user equipment may be connected using the first access point identifier; and dependent on the determination being negative and dependent on the subscriber profile parameter data being set, providing access to a packet data network using a different access point identifier.

This has an advantage that access may be provided to a packet data network in the event that a user equipment requests connection using an access point identifier, such as an Access Point Name (APN), to which the subscription profile associated with the user equipment indicates that the user equipment should not have access. The provision of access has an advantage that the user equipment may be reconfigured by an operator. The access may be of limited connectivity.

In an embodiment of the invention, the method comprises, dependent on the determination being negative and dependent on the subscriber profile parameter data being set, sending a second message to said user equipment accepting attachment of said user equipment to the wireless communication system.

This has an advantage that the user equipment may be attached to the wireless communication system, enabling a connection to a packet data network, so that communication may be established with the user equipment.

In an embodiment of the invention, the method comprises removing the subscriber profile parameter data in said subscription profile and receiving a second message sent from said user equipment requesting connection using a first access point identifier, and dependent on the determination being negative and dependent on the subscriber profile parameter data not being set, declining access to a packet data network.

This has an advantage that access to the packet data network may be declined in some cases according to the setting or not of the subscriber profile parameter data, which may be, for example, an override indicator. For example, a user equipment with a pre-paid subscription that had expired may be denied access.

In an embodiment of the invention the method comprises setting the subscriber profile parameter data to include a different access point identifier to indicate that said user equipment should be connected using the different access point identifier if an attempt to connect using another access point identifier is unsuccessful.

This has an advantage that the subscriber profile parameter data may indicate an access point identifier which may be used for connection of the user equipment in the event of a failed connection attempt.

In an embodiment of the invention the subscriber profile parameter data is held at a server having an association with the wireless communication system.

In an embodiment of the invention the subscription profile is held at a server having an association with the wireless communication system.

In an embodiment of the invention the server is a Home Subscriber Server.

In an embodiment of the invention the method comprises, dependent on the determination being negative and dependent on the setting of the subscriber profile parameter data including the different access point identifier, sending a third message to a gateway associated with said different access point identifier indicating that said user equipment should be connected to the gateway.

In an embodiment of the invention, the method comprises establishing a session including said user equipment and the gateway.

In an embodiment of the invention, the gateway is a Packet Data Network Gateway (P-GW).

In an embodiment of the invention, the first message sent from said user equipment requesting connection using the first access point identifier specifies an Access Point Name (APN) relating to a first gateway.

In an embodiment of the invention, the method comprises, dependent on the determination being negative and dependent on the subscriber profile parameter data being set, establishing a limited connectivity communication session providing access to a packet data network.

This has an advantage that access to a packet data network may be limited, so that a user equipment may not, for example, have access to services offered by the packet data network, but sufficient connectivity may be allowed for the user equipment to be reconfigured.

In an embodiment of the invention the user equipment is a Machine-Type Communication device.

In accordance with a second aspect of the present invention, there is provided apparatus arranged to provide access of a user equipment to a data network via a wireless communication system, the user equipment having an associated subscription profile, the wireless communication system utilising access point identifiers for associating subscribers with specific packet data networks, said subscription profile including at least one access point identifier, the apparatus being arranged to:

set a subscriber profile parameter data in said subscription profile;

receive a first message sent from said user equipment requesting connection using a first access point identifier;

determine on the basis of said subscription profile whether or not said user equipment may be connected using the first access point identifier; and dependent on the determination being negative and dependent on the subscriber profile parameter data being set, provide access to a packet data network using a different access point identifier.

In accordance with a third aspect of the present invention, there is provided a method of providing access of a user equipment to a data network via a wireless communication system, the user equipment having an associated subscription profile, the wireless communication system utilising access point identifiers for associating subscribers with packet data networks, said subscription profile including at least one access point identifier, the method comprising:

setting subscriber profile parameter data in said subscription profile;

receiving a first message sent from said user equipment requesting connection to an access point;

retrieving access point data from said subscription profile;

dependent on said subscriber profile parameter data being in said subscription profile, transmitting signalling parameter data in association with a session establishment request to an access point; and establishing a limited connectivity communication session on the basis of the inclusion of said signalling parameter data in association with said session establishment request.

This has an advantage that access may be provided to a packet data network in the event that a user equipment requests connection using an access point identifier, such as an Access Point Name (APN), to which the subscription profile associated with the user equipment indicates that the user equipment should not have access. The provision of access has an advantage that the user equipment may be reconfigured by an operator.

In an embodiment of the invention, the method comprises establishing a limited connectivity communication session in dependence on said subscriber profile parameter data being set.

In an embodiment of the invention, the method comprises receiving a second message sent from said user equipment requesting connection to an access point and declining a communication session in dependence on said subscriber profile parameter data not being set.

This has an advantage that access to the packet data network may be declined in some cases according to the setting or not of the subscriber profile parameter data, which may be, for example, a limited connectivity indicator. For example, a user equipment with a pre-paid subscription that had expired may be denied access.

In an embodiment of the invention, the method comprises:

establishing a limited connectivity communication session in dependence on a determination that said user equipment is not authorised to be connected to the access point to which connection was requested in the first message.

This has an advantage that reconfiguration of the user equipment by the operator may be allowed while preventing the access of the user equipment to services provided using a packet data network.

In an embodiment of the invention, the method comprises declining a communication session in dependence on a determination that said user equipment is not authorised to be connected to the access point to which connection was requested in the second message.

In an embodiment of the invention, the method comprises setting the subscriber profile parameter data to indicate that access of said user equipment to said data network may be enabled with a limited level of connectivity if a subscriber is not authorised to connect said user equipment to a packet data network, the limited level of connectivity being restricted relative to a level of connectivity applicable if said subscriber is authorised to connect said user equipment to said packet data network. The subscriber profile parameter data, which may be a limited connectivity indicator.

In an embodiment of the invention, the method comprises determining whether or not said user equipment is authorised to be connected to a packet data network identified by the access point by means of authentication of a username and password sent from said user equipment.

In an embodiment of the invention said authentication of the username and password uses PAP/CHAP authentication.

In an embodiment of the invention said subscription profile comprises a plurality of access point names, each access point name having a respective subscriber profile parameter data.

In an embodiment of the invention, said restriction is at least a restriction to access of said user equipment to parts of said packet data network.

In an embodiment of the invention said restriction is at least a restriction to access of said user equipment to services offered by said packet data network.

In an embodiment of the invention said restriction is at least a restriction to a time that said user equipment may access at least parts of said packet data network.

In an embodiment of the invention, said restriction is at least a restriction to a time that said user equipment may access at least services offered by said packet data network.

In an embodiment of the invention, said restriction is at least a restriction to provide access to reconfiguration service for said device to reconfigure said password.

In an embodiment of the invention, said access points is a Packet Data Network Gateway (P-GW).

In an embodiment of the invention, the user equipment is a Machine-Type Communication device.

In an embodiment of the invention, the method comprises establishing the limited connectivity communication session according to rules determined by communication with a server.

In an embodiment of the invention, said server comprises a Policy and Charging Rules Function (PCRF).

In accordance with a fourth aspect of the present invention, there is provided apparatus arranged to provide access of a user equipment to a data network via a wireless communication system, the user equipment having an associated subscription profile, the wireless communication system utilising access point identifiers for associating subscribers with packet data networks, said subscription profile including at least one access point identifier, the apparatus being arranged to:

set a subscriber profile parameter data in said subscription profile;

receive a first message sent from said user equipment requesting connection to an access point;

retrieve access point data from said subscription profile;

dependent on said subscriber profile parameter data being in said subscription profile, transmit a signalling parameter data in association with a session establishment request to an access point; and establish a limited connectivity communication session on the basis of the inclusion of said signalling parameter data in association with said session establishment request.

Further features and advantages of the invention will be apparent form the following description of preferred embodiments of the invention, which are given by way of example only.

MODE FOR THE INVENTION

Figure 1:
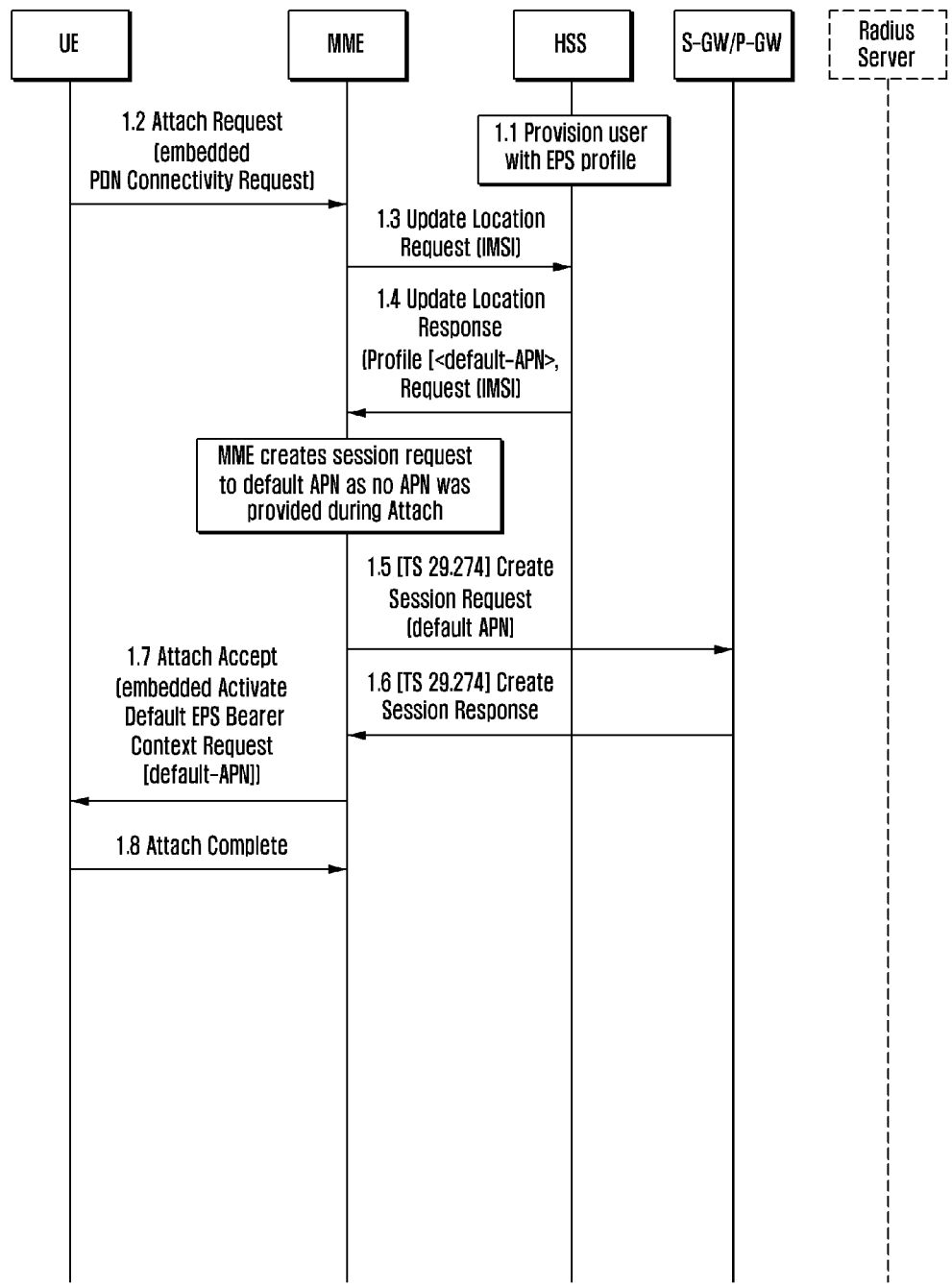
FIG. 1 is a diagram illustrating initial attach success according to the prior art without an Access Point Name supplied by user equipment.

By way of example an embodiment of the invention will now be described in the context of a telecommunication network including a LTE wireless communication system. However, it will be understood that this is by way of example only and that other embodiments may involve wireless communication systems using other radio access technologies, such as IEEE802.16 WiMax systems; embodiments are not limited to the use of a particular radio access technology.

LTE is an "always on technology", so that following a successful initial attach a user equipment (UE) is typically connected to a packet data network (PDN) for an extended period and is given a default bearer. The user's subscription profile applicable to the user equipment contains a number of Access Point Names (APNs) (including the default-APN) that may be downloaded to the Mobility Management Entity/Serving GPRS Serving Node (MME/S4-SGSN) on an Update Location operation. When the UE performs initial attach, it may optionally not include an APN; in this case, the default-bearer for the default-APN provisioned for the user in the MME is activated. Alternatively, the APN may be provided during the attach procedure, typically using the Evolved Packet System Session Management (ESM) Information message and if the APN is provisioned for the user, this APN is activated instead of the default-APN. A user equipment may be pre-configured with an APN that requires username/password authentication, typically using Password authentication Protocol/Challenge Handshake Authentication Protocol (PAP/CHAP). This information may be sent as part of the Protocol Configuration Options (PCO) with the APN in the ESM Information message.

The PCO is typically not inspected by the MME and is sent to the Packet Data Network Gate Way (PGW). The PGW uses the username/password in the PCO to perform authentication with a RADIUS server for the APN activation.

In a conventional system, a problem may occur as follows. If the initial attach fails for example (because the UE sent an APN in the attach procedure that was not provisioned for the user in the network), then the UE may not get any connectivity. Examples of reasons why an APN would be sent that the network does not know about include the following: the user may have accidentally changed the settings in the UE, or the UE may have been pre-configured with an APN based upon subscription and then the operator revoked the subscription temporarily or permanently.

Typically, the behaviour of a UE when it receives an attach error stating that the APN provided was unknown is not defined in not defined in network specifications. The behaviour of UEs can therefore not be relied upon from a network perspective, as it may vary from UE to UE. In some cases, if a UE is provisioned with multiple APN profiles, it may send the next attach with another APN, or alternatively a UE may send the next attach without an APN, or a UE could even decide to keep sending the same APN, as the behaviour of the UE is not specified.

According to an embodiment of the invention, the UE may be given connectivity so that the operator has a connection to the UE to enable the UE to be re-configured. This may be a subscribed feature for the user, controlled by the operator. The Home Subscriber Server (HSS) may contain data in the subscriber's subscription profile (i.e. subscriber profile parameter data) named, for example, an override indicator, which may be called "override-error-APN". This would contain the value of a provisioned APN in the HSS. The "override-error-APN" may be downloaded to the MME as part of an Update Location Request/Update Location Answer (ULR/ULA). The "override-error-APN" could be the default-APN or any other APN, but typically does not have username/password (PAP/CHAP) authentication associated with it. The connectivity provided as a result of the setting of the "override-error-APN" subscriber profile parameter data may offer limited connectivity, so that for example sufficient connectivity may be offered to reconfigure the UE, but the UE may be prevented from accessing certain services, certain parts of a packet data network, or may be prevented from having access at certain times.

When the UE sends the initial attach with the "bad APN", the MME checks the "override-error-APN" and uses the value to attempt activation of that APN instead of sending back an error to the UE. If the UE sent a PCO (irrespective of whether the PCO included a username/password), the PCO is typically removed by the MME before sending a create session request to the PGW, as the PCO pertains to the APN the UE provided and not the APN that the network provided.

Another aspect of a problem that may be encountered by conventional systems is as follows. The UE may send an APN that is provisioned in the network, but the username/password may be incorrect. For example, a username/password may be sent be sent that the network does not know about because the user has accidentally changed the settings in the UE, or a pre-configured username/password has been modified. In this case, the authentication of the APN between the PGW and RADIUS server may fail and the UE may not get any connectivity. As a consequence of not attaining connectivity, the UE gets no service as the UE cannot even perform a UE requested PDN connectivity request, as the attach has failed.

Unlike in General Packet Radio Service (GPRS) where the Packet Data Protocol (PDP) context is activated after attach, the operator does not have the opportunity to even use Short Message Service/Over The Air (SMS/OTA) to reconfigure the UE.

According to an embodiment of the invention, the UE may be given limited connectivity to an APN in this case, that is to say a limited connectivity session may be set up. This may be a subscribed feature controlled by the operator. The user's subscription profile in the HSS may contain subscriber profile parameter data, such as a 'flag', against each APN that may be called, for example, a limited connectivity indicator, or "limited-connectivity-allowed". The "limited-connectivity-allowed" may accompany each APN downloaded to the MME as part of ULR/ULA. On initial attach with APN+PCO, assuming that the APN is provisioned for the user, if the "limited-connectivity-allowed" flag is TRUE, it is included in the 'create session request' sent to the PGW. The PGW may first attempt authentication with an authentication and accounting server, typically a RADIUS server, using the username/password credentials in the APN. If this fails and if "limited-connectivity-allowed" was included, the PGW may supply a default-set of credentials and retry the authentication to the RADIUS server. The default credentials may be used to obtain a limited connectivity to the APN.

In embodiments of the invention, the "override-error-APN" and "limited-connectivity-allowed" functionality may serve the same purpose, that is to say to provide the opportunity for the operator to correct the settings in the UE.

A notification may be sent to a $3^{rd}$ party application server which may send a URL to the UE telling the user to click on the link to go through the procedure of reconfiguring the APN settings correctly and resetting the credentials.

According to embodiments of the invention, the subscriber profile parameter data, typically held at the HSS, may include: "override-error-APN", that may be set to a provisioned APN and is per-user, that is to say specific to a user equipment; and "limited-connectivity", that may be a boolean flag that is associated with each APN. The Update Location Answer message may be modified to include the new information elements (IEs) for the new provisioning options.

According to embodiments of the invention, the MME may be required to store the new information provided by the HSS in the Update Location Answer. In an embodiment of the invention, the MME checks if an un-provisioned APN provided by the UE matches a provisioned APN contained in override-error-APN. If there is a match, the MME may send a Create Session Request containing the APN in the override-error-APN. If there is a match and a PCO was included by the UE, the MME may remove the PCO before sending the Create Session Request.

In an embodiment of the invention, the MME may check if an un-provisioned APN provided by the UE matches a provisioned APN contained in override-error-APN. If there is a match, the MME may send back an error telling the UE to retry the attach without an APN and PCO. When the UE tries the attach again without an APN and PCO, the MME may remember that the attach failed the last time and connects the UE to the APN provided in the override-error-APN. If the MME is in receipt of the limited-connectivity-allowed flag, the MME may include this flag in the Create Session Request if the APN provided by the UE matches that in the MME.

Limited connectivity may be defined by a set of policies that is applied in the connectivity of the UE that presents some restrictions compared to the "default" unrestricted policy. The restrictions may be defined either in terms of the access that is provided to the UE to access the services provided in the Packet Data Network (PDN) that is served by an APN or time that the UE is allowed to access the services. Another example of limited connectivity is if dynamic PCC is deployed then the Limited-connectivity-allowed flag can be passed to a Policy and Charging Rules Function (PCRF) using the IP-CAN Establishment Req. and indicate to PCRF to employ Limited Connectivity rules for this UE and session. In this case the P-GW playing the role of PCRF may send the IP-CAN Session Est. message with the addition of the "limited-connectivity-allowed" flag. The PCRF may provide the relevant rules for limited-connectivity-mode for this subscriber. The rules for limited connectivity that PCRF can apply may be UE specific or generic for this particular APN. The "limited-connectivity-allowed" identifier could be a new AVP in the list of Gx application used for CCR from P-GW to PCRF. In general the restrictions related to limited connectivity may be determined by the nature of the services this APN provides. One example of restriction may be that the PGW that receives the Limited Connectivity Mode (LCM) Flag configures a set of firewall rules that block some or all the ports of the IP address of the UE except a limited number, or one.

According to embodiments of the invention, default credentials may be stored in the PGW to allow for authentication override. If authentication fails related to communication with the RADIUS server, then the UE may use default credentials on the PGW to re-attempt the authentication if the limited-connectivity-allowed flag sent in the Create Session Request was set to TRUE.

FIG. 1 is a diagram illustrating initial attach success according to the prior art without an Access Point Name supplied by user equipment. As has already been mentioned, the supply of an APN by the UE is optional on initial attachment to the wireless communication system. It can be seen from FIG. 1, at steps 1.1 to 1.8, that attachment may be successful in this case using a default APN held in a subscription profile at the HSS.

Figure 2:
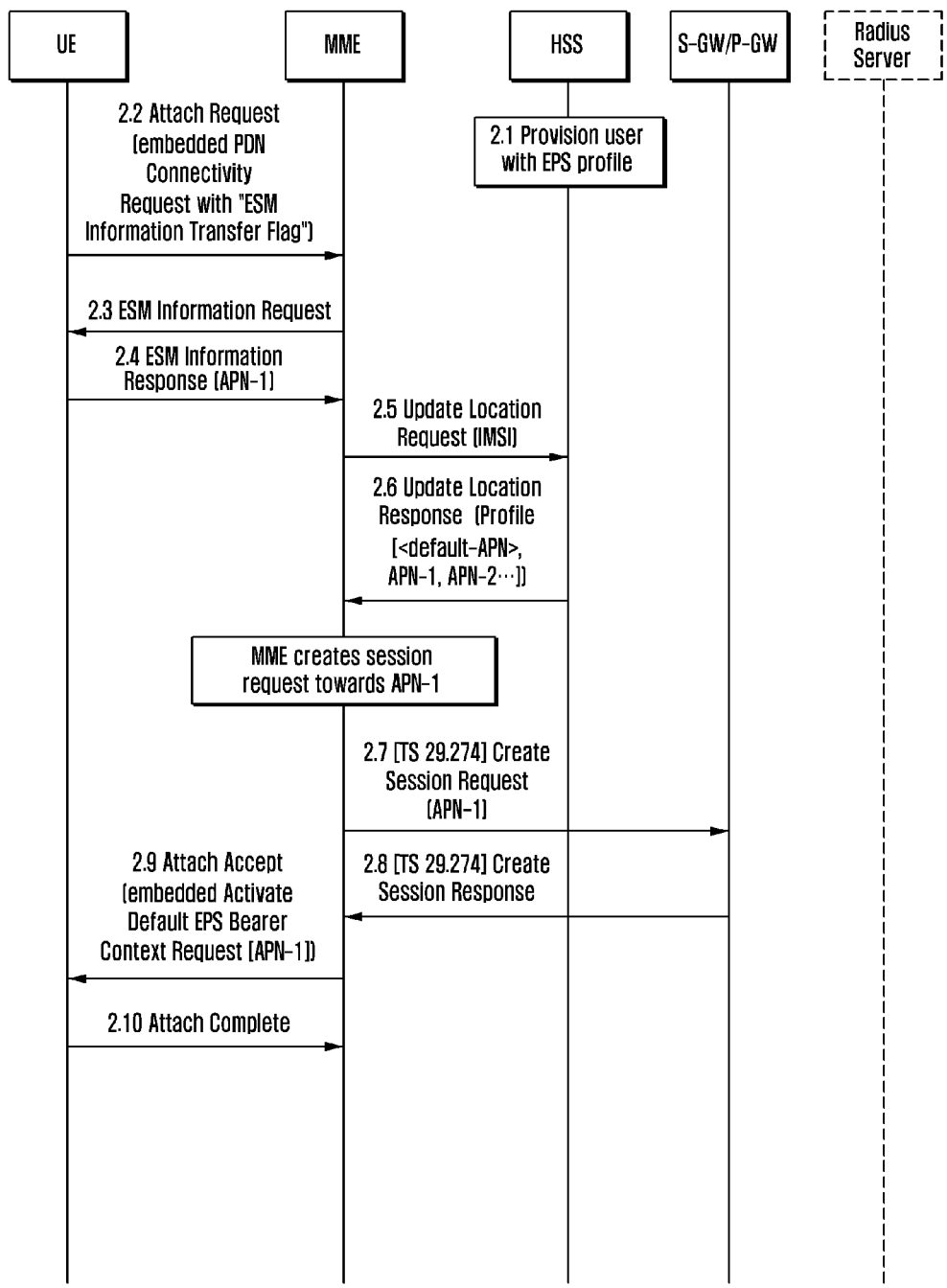
FIG. 2 is a diagram illustrating initial attach success according to the prior art with Access Point Name supplied by user equipment.

FIG. 2 is a diagram illustrating initial attach success according to the prior art in the case that an Access Point Name is optionally supplied by user equipment. It can be seen from FIG. 2 at steps 2.1 to 2.10 that the user equipment requests attachment to a specific APN, in this case APN-1, and that it is determined whether or not the user equipment may be connected using this APN, on the basis of a subscription profile for the user held at the HSS. In the case illustrated, the user equipment is authorised to be connected using the specified APN, and attachment is accepted.

Figure 3:
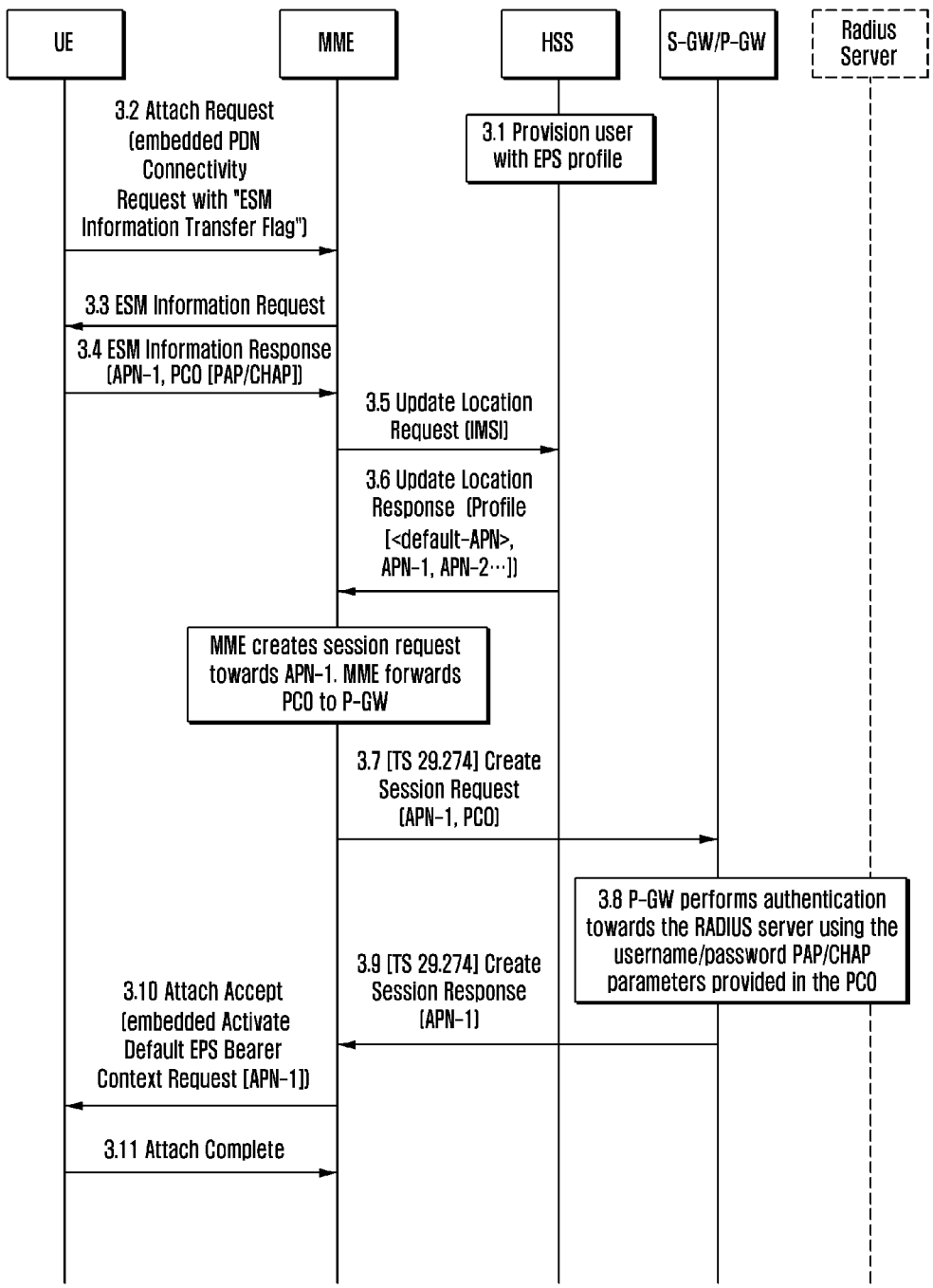
FIG. 3 is a diagram illustrating initial attach success according to the prior art based on username/password supplied by user equipment.

FIG. 3 is a diagram illustrating initial attach success according to the prior art based on username/password supplied by user equipment. It can be seen from FIG. 2 at steps 3.1 to 3.6 that the user equipment requests attachment to a specific APN, in this case APN-1, and that it is determined whether or not the user equipment may be connected using this APN, on the basis of a subscription profile for the user held at the HSS. The MME then creates a session request to the S-GW/P-GW, which communicates with a RADIUS server to perform authentication of a username and password PAP/CHAP parameters provided in a Protocol Configuration Options (PCO) parameter supplied by the UE. In the case illustrated, the authentication is conformed, and attachment of the UE is accepted at step 3.10.

Figure 4:
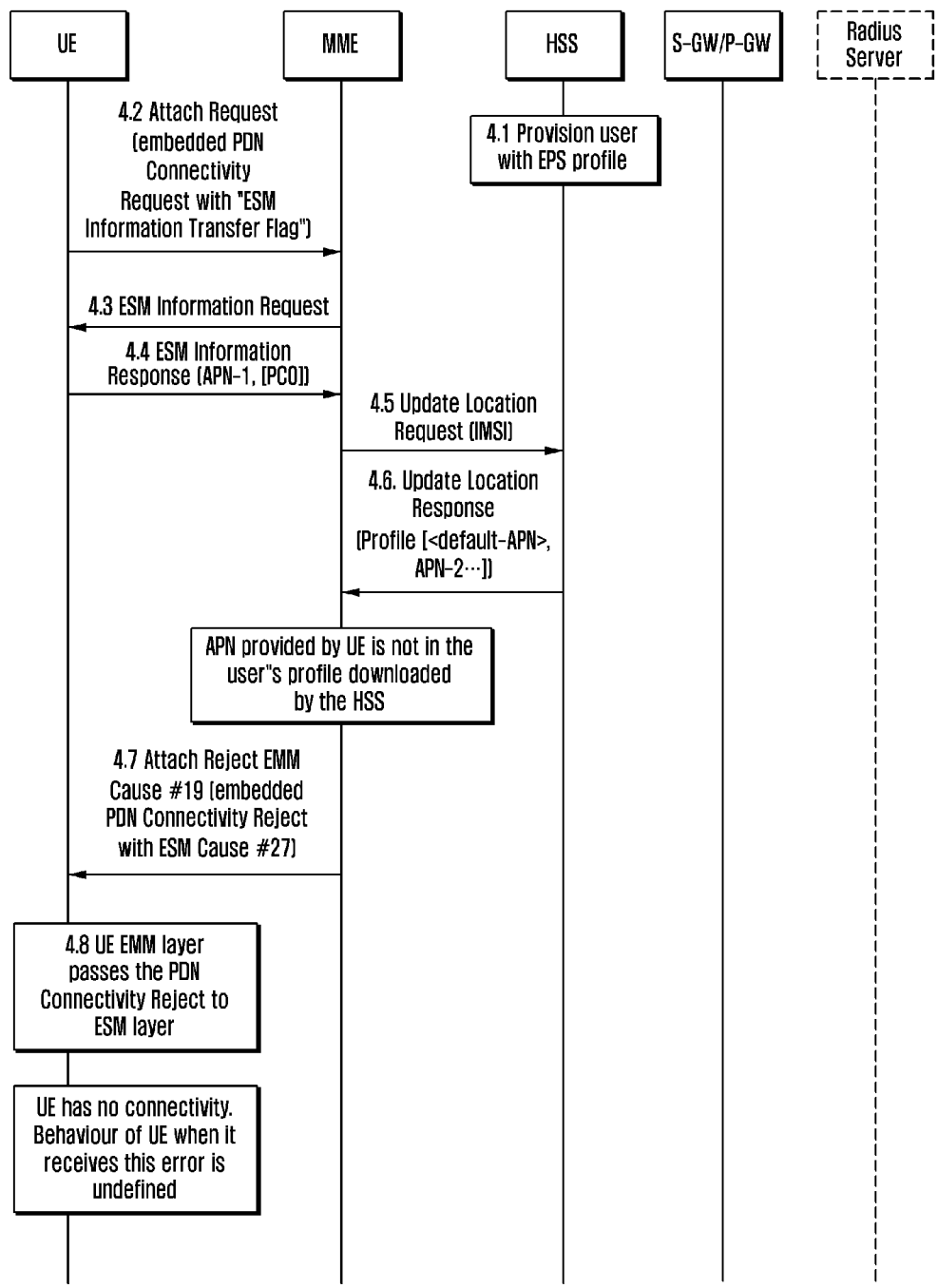
FIG. 4 is a diagram illustrating initial attach failure according to the prior art.

FIG. 4 is a diagram illustrating initial attach failure according to the prior art; in this case, in contrast to the case of FIG. 2, the user equipment is not authorised to be connected using the specified APN, as the APN provided by the UE is not in the user's subscription profile downloaded by the HSS, and attachment is rejected at steps 4.7 and 4.8.

Figure 5:
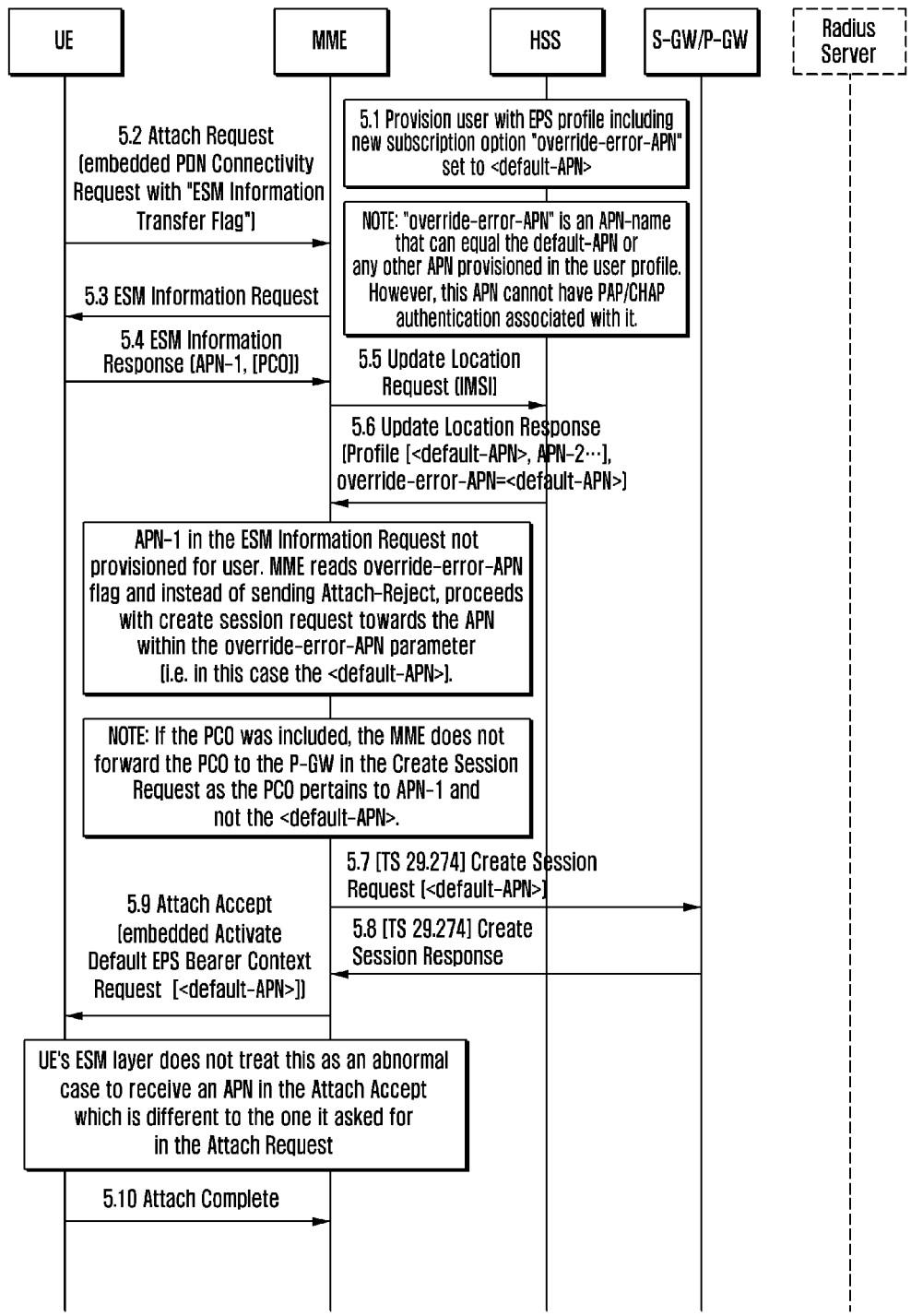
FIG. 5 is a diagram illustrating signal flow to allow override functionality according to a first embodiment of the invention.

FIG. 5 is a diagram illustrating signal flow to allow override functionality according to a first embodiment of the invention. FIG. 5 relates to a method of providing access of a user equipment to a data network via a wireless communication system, in this case a LTE packet switched wireless system. The user equipment has an associated subscription profile, held at the HSS, including data relating to which access point identifiers (in this case an APN) the user equipment may use, each access point identifier being for associating subscribers with specific packet data networks. An override indicator, referred to as override-error-APM is set as subscriber profile parameter data in the subscription profile.

The MME receives a first message at step 5.4, sent from the user equipment at step requesting connection using a first access point identifier, in this case APN-1. The HSS downloads data from the subscription profile to the MME in response to an update location request. The MME determines on the basis of the downloaded data from the subscription profile whether or not the user equipment may be connected using the first access point identifier. In the case of FIG. 5, it may not, as the access point identifier is not provisioned for the user equipment. The determination is therefore negative, but the subscriber profile parameter data is set, namely override-error-APN, and so access is provided access to a packet data network using a different access point identifier, in this case the default-APN indicated in the Update location response 5.6. The provision of access has an advantage that the user equipment may be reconfigured by an operator, but access may be of limited connectivity.

A second message to said user equipment at step 5.9 accepting attachment of the user equipment to the wireless communication system.

In contrast to the case shown in FIG. 5, the subscriber profile parameter data, and specifically the override-error-APN may be removed from the subscription profile for certain APNs and certain user equipment. Then, if a message sent from said user equipment requesting connection using a first access point identifier is received, and it is determined that the requested access point identifier is not authorised for connection of the user equipment, and the override-error-APN is not set, access to the packet data network may be declined. For example, a user equipment with a pre-paid subscription that had expired may be denied access.

The subscriber profile parameter data typically includes a different access point identifier to indicate that said user equipment should be connected using the different access point identifier if an attempt to connect using another access point identifier is unsuccessful. A message may be sent to a gateway associated with said different access point identifier indicating that the user equipment should be connected to the gateway. as at step 5.7 for example. A limited connectivity communication session may be set up to provide access to a packet data network, so that a user equipment may not, for example, have access to services offered by the packet data network, but sufficient connectivity may be allowed for the user equipment to be reconfigured.

The user equipment may be a Machine-Type Communication device, such a meter reading device; in this case it is particularly valuable to have access to reconfigure the user equipment, as the user equipment may be in an inaccessible location.

Figure 6:
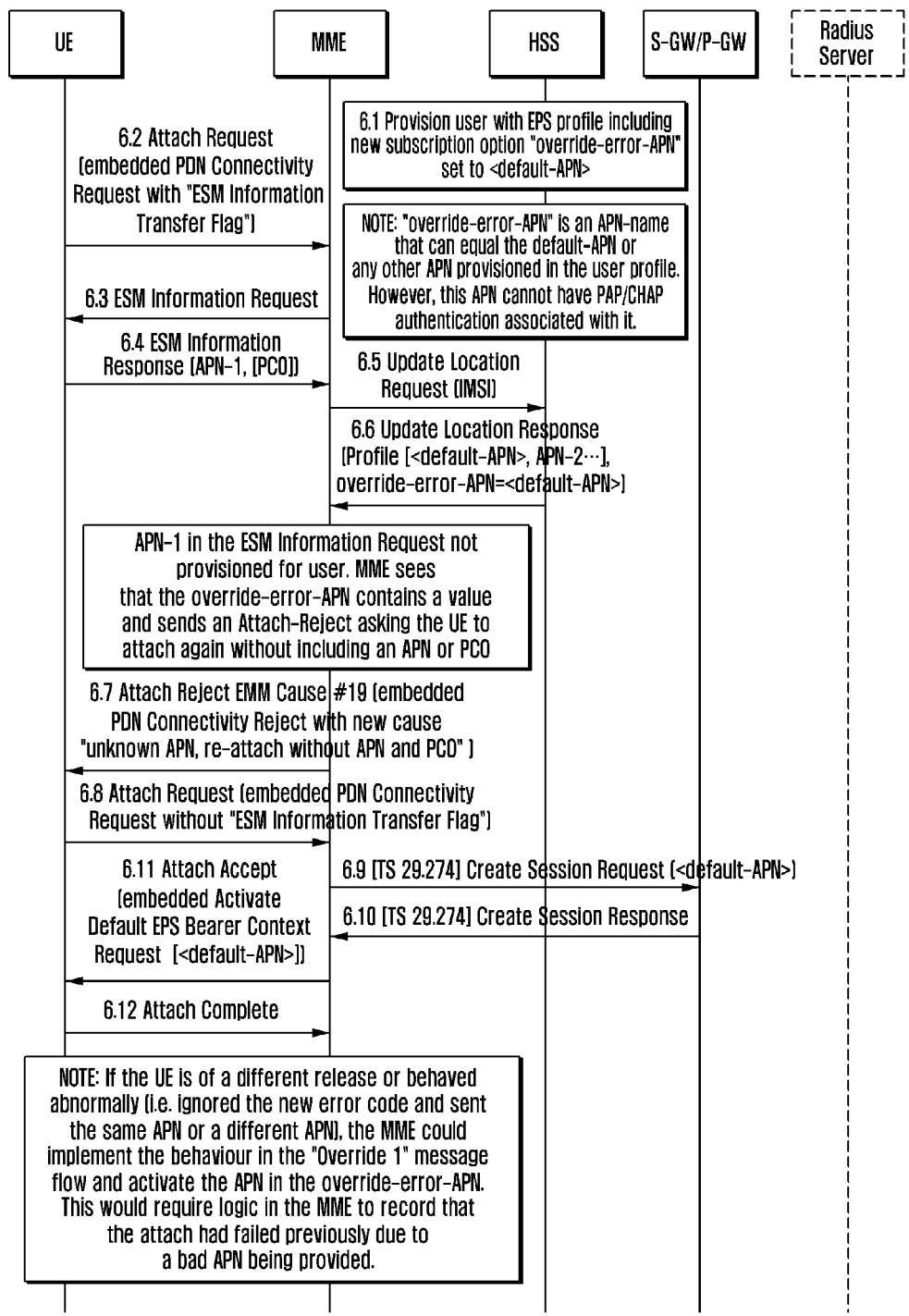
FIG. 6 is a diagram illustrating signal flow to allow override functionality according to a second embodiment of the invention.

FIG. 6 is a diagram illustrating signal flow to allow override functionality according to a second embodiment of the invention. FIG. 6 relates to the case where the MME determines that the override-error-APN indicator is set and asks the UE to attach again without specifying an APN or including a PCO. The UE then connects using a default APN.

Figure 7:
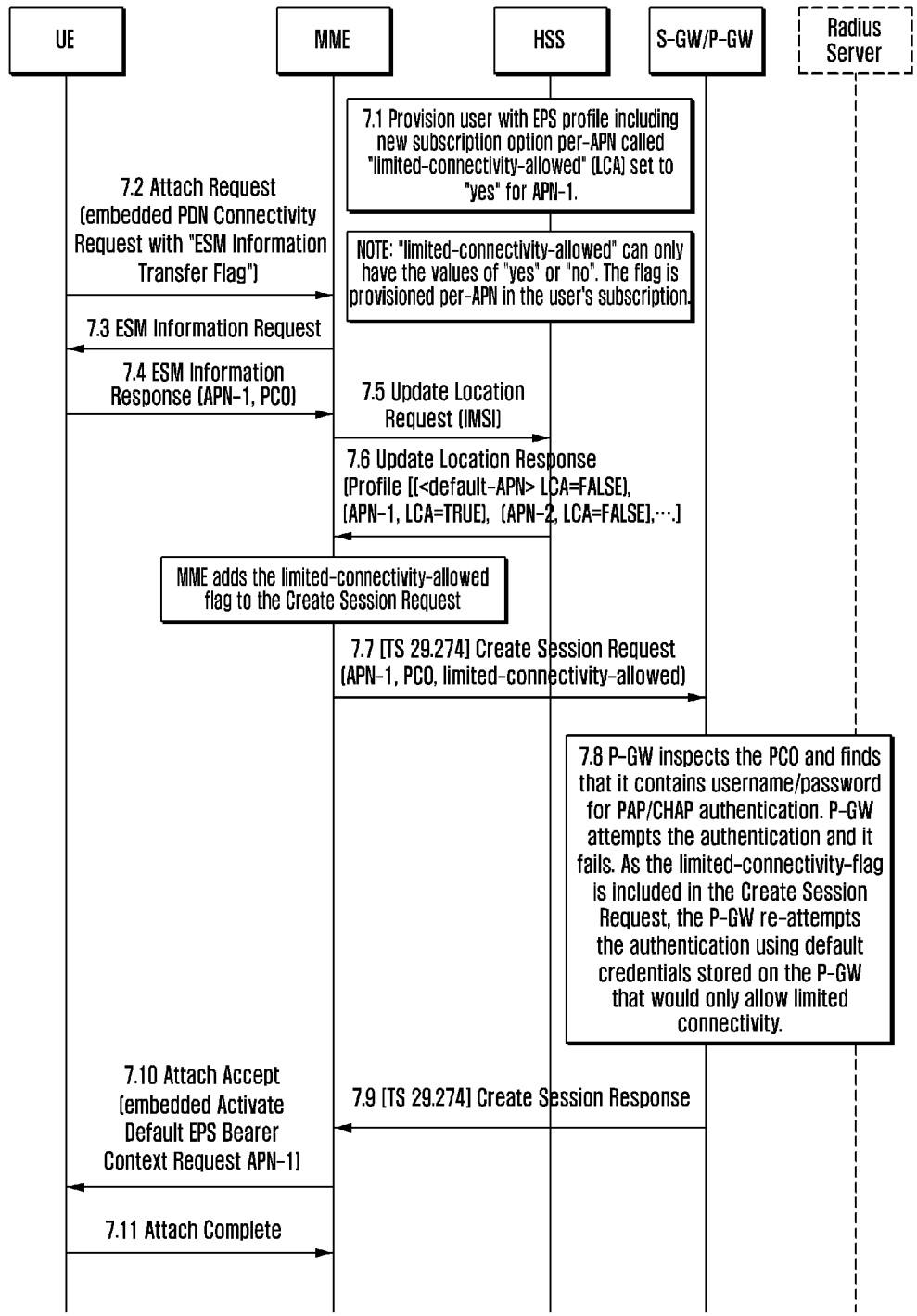
FIG. 7 is a diagram illustrating signal flow to allow limited connectivity according to an embodiment of the invention.

FIG. 7 is a diagram illustrating signal flow to allow limited connectivity according to an embodiment of the invention. FIG. 7 relates to the case where a limited-connectivity-allowed (LCA) indicator is set as subscriber profile parameter data in the subscription profile for a user equipment, specific to an APN. A first message sent from said user equipment requesting connection to an access point, and access point data is retrieved from the subscription profile at the HSS. It is determined whether or not the user equipment is authorised to be connected to the packet data network identified by the access point by means of authentication of a username and password sent from said user equipment, in this example using PAP/CHAP authentication. In the case illustrated by FIG. 7, authentication fails, and dependent on the limited-connectivity-allowed indicator being in the subscription profile, signalling parameter data is transmitted in association with a session establishment request to an access point, in this case to the S-GW/P-GW and a limited connectivity communication session established on the basis of the inclusion of the signalling parameter data in association with the session establishment request.

Alternatively, a communication session may be declined in dependence on the limited-connectivity-allowed indicator not being set. For example, a user equipment with a pre-paid subscription that had expired may be denied access.

The limited-connectivity-allowed indicator indicates that access of said user equipment to said data network may be enabled with a limited level of connectivity if a subscriber is not authorised to connect said user equipment to a packet data network, the limited level of connectivity being restricted relative to a level of connectivity applicable if said subscriber is authorised to connect said user equipment to said packet data network. The restriction may be a restriction to access of the user equipment to parts of said packet data network, a restriction to access of the user equipment to services offered by the packet data network, and/or a restriction to a time that said user equipment may access parts of the packet data network or services offered by the packet data network. The restriction may be a restriction to provide access to reconfiguration service for said device to reconfigure the password.

The limited connectivity communication session may be established according to rules determined by communication with a server, such as a Policy and Charging Rules Function (PCRF).

The user equipment may be a Machine-Type Communication device.

INDUSTRIAL APPLICABILITY

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of mobility management entity (MME) for providing access of a terminal to a data network via a wireless communication system, the method comprising:
setting subscriber profile parameter data in a subscription profile, wherein the subscription profile includes at least one access point identifier;
receiving, from the terminal, a first message requesting connection to the data network, the first message including a first access point identifier;
determining that the terminal is allowed to be connected to the data network using the first access point identifier, based on the subscription profile; and
transmitting a second message requesting a limited connection of the terminal to the data network using a second access point identifier included in the subscriber profile parameter data set in the subscription profile, if the terminal is not allowed to be connected to the data network using the first access point identifier,
wherein the terminal is reconfigured to be connected to the data network using the limited connection.

2. The method of claim 1, further comprising:
transmitting, to the terminal, a third message accepting attachment of the terminal to the wireless communication system based on the subscriber profile parameter data set in the subscription profile, if the terminal is not allowed to be connected to the data network using the first access point identifier.

3. The method of claim 1, further comprising:
removing the subscriber profile parameter data in the subscription profile;
receiving, from the terminal, a third message requesting connection to the data network, the third message including the first access point identifier; and
rejecting access to the data network, if the terminal is not allowed to be connected to the data network using the first access point identifier and the subscriber profile parameter data is removed.

4. The method of claim 1, wherein the setting of the subscriber profile parameter data comprises setting the subscriber profile parameter data to include the second access point identifier indicating that the terminal is allowed to be connected to the data network using the second access point identifier, if the terminal is not allowed to be connected to the data network using the first access point identifier.

5. The method of claim 1, wherein the subscriber profile parameter data is held at a server having an association with the wireless communication system.

6. The method of claim 4,
wherein the transmitting of the second message comprises transmitting the second message to a gateway associated with the second access point identifier.

7. The method of claim 6, further comprising establishing a session including the terminal and the gateway.

8. The method of claim 1, wherein the first message received from the terminal requesting connection using the first access point identifier specifies an access point name (APN) related to a first gateway.

9. A mobility management entity (MME) arranged to provide access of a terminal to a data network via a wireless communication system, the MME comprising a controller configured to:
set a subscriber profile parameter data in a subscription profile, wherein the subscription profile includes at least one access point identifier;
receive, from the terminal, a first message requesting connection to the data network, the first message including a first access point identifier;
determine that the terminal is allowed to be connected to the data network using the first access point identifier, based on the subscription profile; and
transmit a second message requesting a limited connection of the terminal to the data network using a second access point identifier included in the subscriber profile parameter data set in the subscription profile, if the terminal is not allowed to be connected to the data network using the first access point identifier,
wherein the terminal is reconfigured to be connected to the data network using the limited connection.

10. A method of a mobility management entity (MME) for providing access of a terminal to a data network via a wireless communication system, the method comprising:
setting a subscriber profile parameter data indicating whether a limited connection of the terminal to the data network is allowed in a subscription profile, wherein the subscription profile includes at least one access point identifier;
receiving, from the terminal, a first message requesting connection to the data network, the first message including a first access point identifier;
transmitting signaling parameter data in association with a session establishment request to the data network including the subscriber profile parameter data, if the terminal is not allowed to be connected to the data network using the first access point identifier and the subscriber profile parameter data indicates that the limited connection of the terminal to the data network is allowed; and establishing a limited connectivity communication session based on the subscriber profile parameter data, wherein the terminal is reconfigured to be connected to the data network using the limited connectivity communication session.

11. The method of claim 10, further comprising:
declining the session establishment request if the subscriber profile parameter data indicates that the limited connection is not allowed.

12. The method of claim 10, the method comprising:
establishing a limited connectivity communication session based on a determination that the terminal is not authorized to be connected to the data network to which connection was requested in the first message.

13. The method of claim 11, further comprising:
declining the session establishment request based on a determination that the terminal is not authorized to be connected to the data network to which connection was requested in the first message.

14. The method of claim 10, further comprising:
setting the subscriber profile parameter data to indicate that access of the terminal to the data network is to be enabled with a limited level of connectivity, if a subscriber is not authorized to connect the terminal to the data network, the limited level of connectivity being restricted relative to a level of connectivity applicable if the subscriber is authorized to connect the terminal to the data network.

15. The method of claim 12, further comprising determining whether the terminal is authorized to be connected to the data network identified by the access point by means of authentication of a username and password sent from the terminal.

16. The method of claim 10, wherein each access point identifier has a respective subscriber profile parameter data.

17. The method of claim 14, wherein the restriction comprises at least one of a restriction to access of the terminal to parts of the data network, a restriction to access of the terminal to services offered by the data network, a restriction to a time that the terminal is permitted to access at least parts of the data network, and a restriction to a time that the terminal is permitted to access at least services offered by the data network.

18. A mobility management entity (MME) arranged to provide access of a terminal to a network via a wireless communication system, the MME comprising:
a controller configured to:
set a subscriber profile parameter data indicating whether the limited connection is allowed in the subscription profile, wherein the subscription profile includes at least one access point identifier,
receive, from the terminal, a first message requesting connection of the terminal to the data network, the first message including first access point identifier,
transmit a signaling parameter data in association with a session establishment request to the data network including the subscriber profile parameter data, if the terminal is not allowed to be connected to the data network using the first access point identifier and the subscriber profile parameter data indicates that the limited connection of the terminal to the data network is allowed, and
establish a limited connectivity communication session based on the subscriber profile parameter data,
wherein the terminal is reconfigured to be connected to the data network using the limited connectivity communication session.

19. The method of claim 1, wherein the connectivity of the limited connection is prevented from accessing one or more services.

20. The method of claim 1, wherein the connectivity of the limited connection is prevented from accessing one or more portions of the data network.

21. The method of claim 1, wherein the connectivity of the limited connection is prevented from accessing the data network at one or more times.

22. The method of claim 1, wherein the connectivity of the limited connection is limited by at least one firewall rule blocking one or more ports associated with a network address of the terminal.

23. The method of claim 1, wherein connectivity of the limited connection is configured to provide limited access without using a short message service (SMS).

* * * * *